Patented May 26, 1942

2,283,916

UNITED STATES PATENT OFFICE 2,283,916

WELDING

George F. Comstock, Niagara Falls, N. Y., assignor to The Titanium Alloy Manufacturing Company, New York, N. Y., a corporation of Maine No Drawing. Application September 18, 1940, Serial No. 357,306

4 Claims. (Cl. 219—8)

This invention relates to the welding of chromium steels, and more particularly to welding rod compositions for the welding of such steels, and welded constructions produced therefrom.

Fusion welds of 5% chromium steels, which are widely used in industry, are hard and brittle when cooled at normal speed after welding, and must be either heat-treated or made with expensive austenitic steel welding rods in order to be soft enough for machining or ductile enough for safety in service. It is known that a small percentage of titanium incorporated in the steel, equal to at least four times the carbon content, will prevent air-hardening of 5% chromium steel on rapid cooling by combining with the carbon to form titanium carbide. However, this effect of titanium has so far not been utilized in fusion welds because it was thought to be impossible to retain sufficient titanium in the steel deposited in the weld. The reason for this difficulty is the readiness with which titanium combines with oxygen at the temperature of molten steel, so that when used in welding in the ordinary way most of the titanium in the welding rod is lost by oxidation. Hitherto, all attempts to include more than a certain minimum titanium content in the welding rod composition have resulted in the loss of such a large portion of this titanium by oxidation during the welding operation that there is not sufficient recovered to combine with all the carbon normally present in such welding rods.

I have found that by having a sufficiently large titanium content in the welding rod, and by providing a welding rod coating containing as small an amount as possible of substances, including oxides, reducible by titanium, it is possible to produce finished welds containing ample titanium to combine with all the carbon present. Such welds are soft and ductile as deposited without heat-treatment and without resorting to the use of any steel containing nickel, or chromium over 6%.

The amount of titanium included in the welding rod should be enough so that the titanium recovered will combine with all the carbon present. As the recovery of titanium in the finished weld (that is, titanium not lost by oxidation, etc.), when using welding rod coatings in accordance with the present invention, is about 40%, and as 4 parts of titanium are necessary to combine with 1 part of carbon, it is seen that the titanium content should be at least 10 times the carbon content. In addition, further amounts of titanium may be incorporated to impart other properties to the welded structure. In practice, from 1 to 10% titanium in the welding rods, resulting in welded structures containing 0.4 to 4% titanium, have been found satisfactory.

In welding rods of this type it is preferred to keep the carbon below 0.1%. The chromium constitutes 4 to 6% of the rod. In addition, other elements such as manganese, silicon, molybdenum, etc., are preferably incorporated in the rod to impart other properties to the finished structure. The bulk of the rod, of course, is iron, with the ordinary impurities that occur in iron, such as sulfur, phosphorus, etc.

Welding rod coatings suitable for the practice of the present invention are those containing not more than 5% of substances reducible by titanium. Usually it is necessary to use a small amount of sodium silicate to bind the particles of the coating together, the silica being reducible by the titanium. However, by forming such a coating by extrusion methods it is possible to keep the amount of silica present to as low as 1%, which is not sufficient to hinder the recovery of ample titanium. One of the most useful of such substances which are not reducible by titanium is calcium fluoride.

Both the welding rod and the coating are formed by methods well known in the art. The same is true of the welding operation itself.

The invention having been described, the following table illustrates several welding rod compositions which are suitable in the practice of the present invention:

Table (per cent)

|  | 1 | 2 | 3 |
|---|---|---|---|
| Carbon | .064 | .054 | .058 |
| Manganese | .51 | .35 | .39 |
| Silicon | .32 | .44 | .52 |
| Chromium | 4.46 | 5.36 | 5.40 |
| Molybdenum | .43 | .58 | .57 |
| Titanium | 1.65 | 3.00 | 3.87 |
| Iron plus impurities | Balance | Balance | Balance |

The following is a suitable coating for these welding rod compositions:

Per cent
$CaF_2$ ------------------------------------- 96
MgO -------------------------------------- 2
$Na_2SiO_3$ --------------------------------- 2

A typical steel bar on which welding rods of the above type can be used shows the following analysis (per cent):

Carbon ----------------------------------- .07
Manganese -------------------------------- .43
Silicon ------------------------------------ 1.01
Chromium -------------------------------- 4.90
Molybdenum ------------------------------ .51
Titanium --------------------------------- .37
Iron plus impurities ---------------- Balance When the welding rod composition No. 1 above was provided with the above specific weld rod coating and used to weld steel of the above specific composition, it gave an analysis of weld metal as follows (per cent):

| | |
|---|---:|
| Carbon | .07 |
| Manganese | .33 |
| Silicon | .82 |
| Chromium | 5.28 |
| Titanium | .64 |
| Iron, molybdenum, and impurities | Balance |

The weld metal deposit had a Rockwell B hardness of 105 and a Brinell hardness of 269, while on the steel bar itself just below the weld the Rockwell B hardness was 92. The welded section could be bent 180 degrees without breaking.

By the use of welding rods according to the present invention it is possible to produce welds, composed entirely of 5% chromium steel, that are sufficiently ductile to be bent at least 45° and in many cases practically flat and no harder than 300 Brinell or 110 Rockwell B at any point, in the welded condition without heat-treatment.

When parts or percentages are mentioned, parts or percentages by weight are understood.

As many variations are possible within the scope of this invention, it is not intended to be limited except as defined by the appended claims.

I claim:

1. A welding rod comprising 4 to 6% chromium, 1 to 10% titanium, up to 0.1% carbon, and iron, the amount of titanium being at least 10 times the amount of carbon, said rod being provided with a coating containing a major proportion of calcium fluoride with not more than 5% of substances reducible by titanium at welding temperatures.

2. A welding rod comprising 4 to 6% chromium, 1 to 10% titanium, small quantities to 1% molybdenum, small quantities to 1% manganese, small quantities to 2% silicon, less than 0.1% carbon, and iron, the amount of titanium being at least 10 times the amount of carbon, said rod being provided with a coating containing a major portion of calcium fluoride and a small amount of sodium silicate as a binder, the amount of substances reducible by titanium at welding temperatures, including sodium silicate, being not more than 5%.

3. A welded construction comprising a plurality of parts of steel containing 4 to 6% chromium, a welded joint between said parts, said joint containing 4 to 6% chromium, 0.4 to 4% titanium, less than 0.1% carbon, and iron, the amount of titanium being at least 4 times the amount of carbon, said joint, without subsequent heat treatment, having a hardness less than 300 Brinell and less than 110 Rockwell B, and being sufficiently ductile to be bent at least 45°.

4. A welded construction comprising a plurality of parts of steel containing 4 to 6% chromium, a welded joint between said parts, said joint containing 4 to 6% chromium, 0.4 to 4% titanium, small quantities to 1% molybdenum, small quantities to 1% manganese, small quantities to 2% silicon, less than 0.1% carbon, and iron, the amount of titanium being at least 4 times the amount of carbon, said joint, without subsequent heat treatment, having a hardness less than 300 Brinell and less than 110 Rockwell B, and being sufficiently ductile to be bent at least 45°.

GEORGE F. COMSTOCK.